United States Patent Office 3,414,193
Patented Dec. 3, 1968

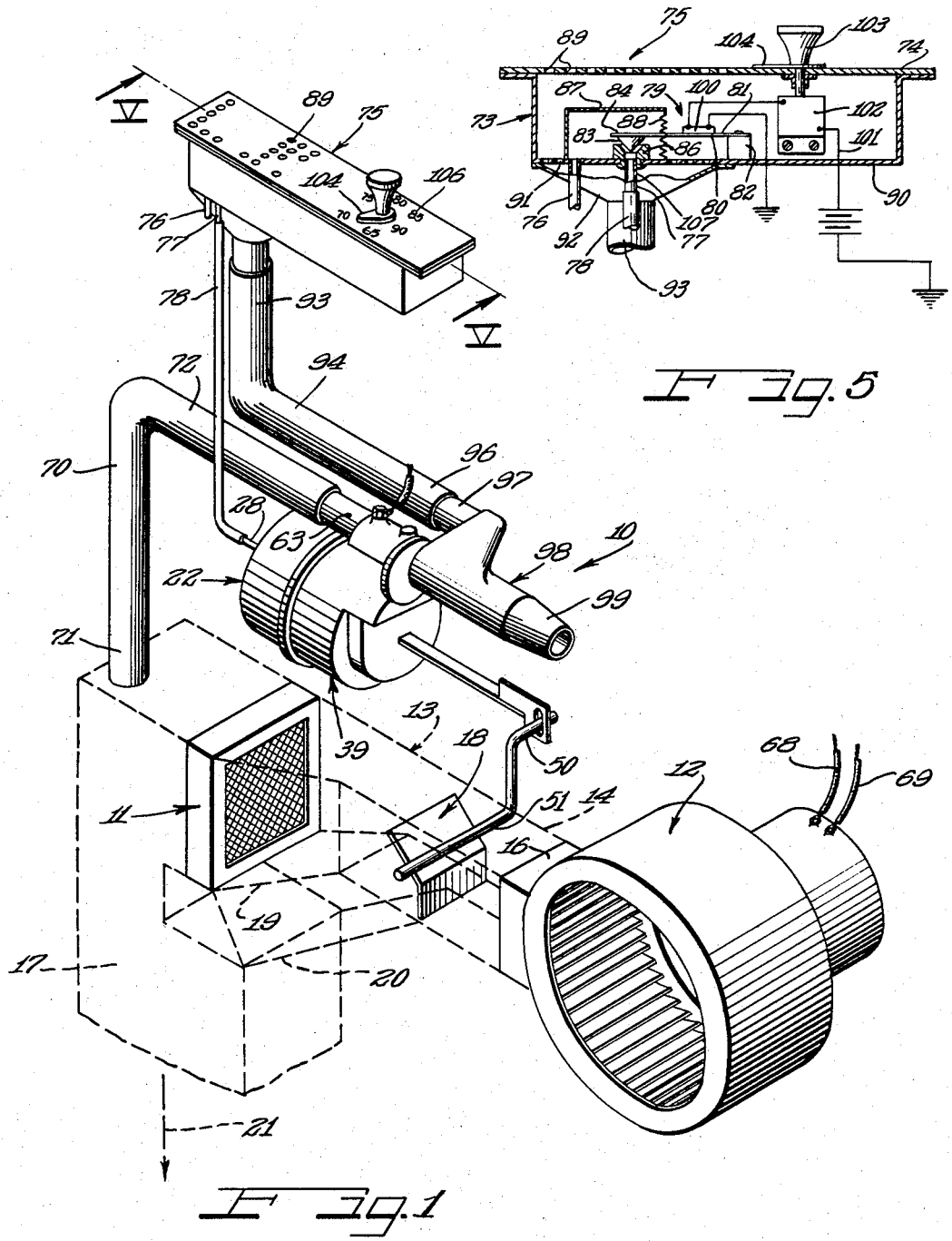

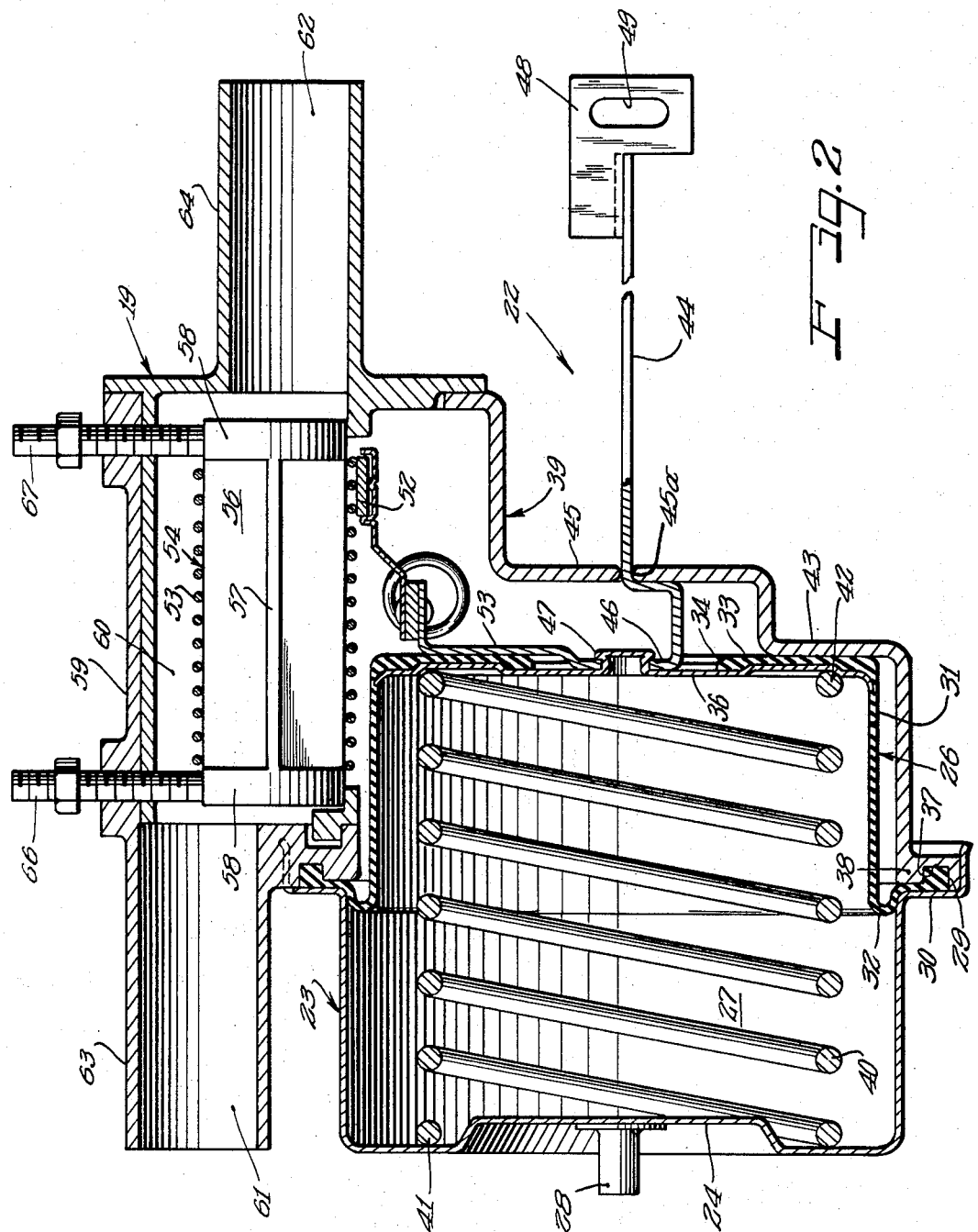

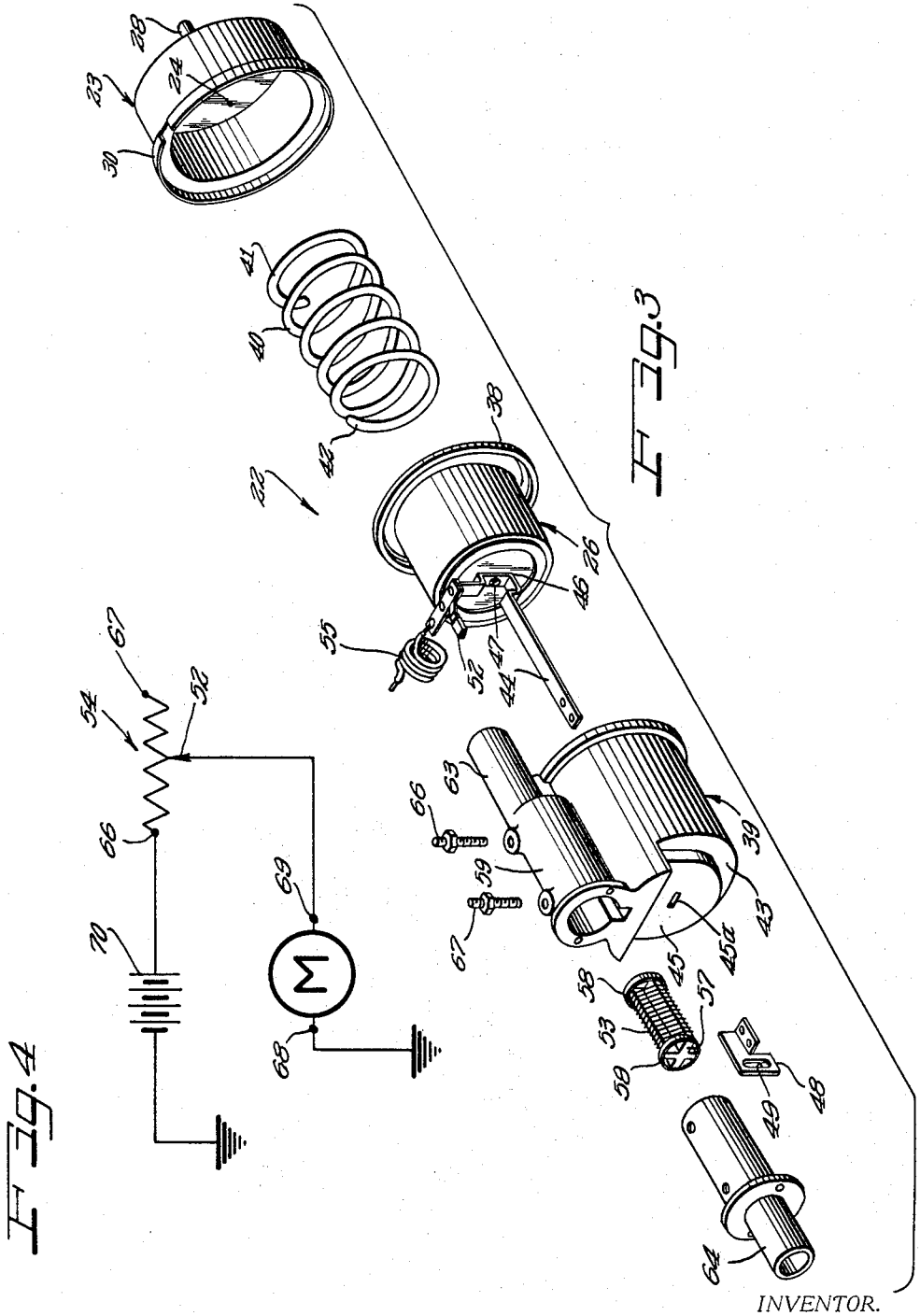

3,414,193
TEMPERATURE CONTROL SYSTEM
Rudolph J. Franz, Arlington Heights, Ill., assignor to The
Dole Valve Company, Morton Grove, Ill., a corporation of Illinois
Filed Aug. 5, 1966, Ser. No. 570,523
5 Claims. (Cl. 237—2)

ABSTRACT OF THE DISCLOSURE

A temperature control system for use in an automobile including a variable speed air blower for varying the flow rate of air across a heat exchanger coil and an adjustable damper for diverting a portion of the air around the coil. The speed of the air blower and the setting of the damper are both controlled by a vacuum operated servo unit connected to the intake manifold of the engine.

---

This invention relates generally to temperature control systems and more particularly to a system for controlling the temperature of the air in a conditioned space, which system includes a variable speed electric motor driven air blower for circulating air through a bypass section, across a heat exchanger and into the conditioned space. The system also includes means for controlling the speed of the blower and the setting of a bypass damper in the bypass section as a function of the temperature in the conditioned space through the utilization of a vacuum-operated power servomechanism.

The present invention is particularly suitable though not limited for use in conditioning air within an automobile wherein the source of vacuum comprises a connection to the suction manifold of the engine. Automobiles are generally equipped with a forced air system which includes a variable speed fan for circulating air from the interior of the automobile across a heat exchanger such as a heating or cooling coil and back to the interior.

According to this invention the duct between the fan or blower and the heat exchanger includes a bypass section having an adjustable bypassed damper for bypassing air around the heat exchanger. The setting of the damper determines the division of the air flow across and around the heat exchanger.

It is contemplated in this invention that the flow rate of air across the heat exchanger increases as the heating or cooling load increases, assuming a fairly constant temperature of the heat exchanger. This increase of air flow with load can be accomplished both by increasing the speed of the fan (within the limiting performance characteristics of the fan) and by adjusting the bypass damper to reduce the amount of air bypassing the heat exchanger.

The invention includes a vacuum operated servomechanism for controlling both the setting of the bypass damper and the speed of the air blower. It should be understood, however, that the servomechanism can also be operated by a pressure as well as a vacuum condition in applications in which a positive rather than a negative source of air or other fluid is available.

The operation of the servomechanism is, in turn, regulated by means responsive to the temperature of the air within the conditioned space of the automobile. A valve mechanism is disposed in the connection between the servomechanism and the intake manifold of the engine for regulating the level of vacuum being applied to the servomechanism. The valve itself is mounted on a movable arm, the positioning of which is controlled by means responsive to the temperature of the surrounding air and which may comprise a bi-metallic member, an expansible fluid-filled controller or similar temperature responsive device.

In order to control the opening of the valve as a function of the air temperature within the automobile, the invention comprises an aspirator device for drawing air from the interior of the automobile across the bi-metal valve. A temperature selector or thermostatic-type control is also included in the invention and comprises an electric heater associated with the bi-metal valve and controlled by a rheostat manually operable by an occupant of the automobile to select the desired air temperature therewithin.

The aspirator serves an additionally useful function in circulating air across a servomechanism-controlled rheostat which regulates the speed of the air blower, thus dissipating heat generated by the resistance windings of the rheostat. The aspirated air, after flowing across the bi-metal valve or blower rheostat, can either be dumped or returned to the interior of the automobile.

It is, therefore, an object of the present invention to provide a temperature control system for controlling the temperature of a conditioned space comprising a variable speed electric motor driven air blower and an air bypass damper with a vacuum operated servomechanism responsive to the temperature of the air in the conditioned space for controlling the setting of the damper and the speed of the blower.

Another object of the invention is to provide an air blower speed controlling rheostat adjusted by the servomechanism and cooled by air circulated thereacross by the air blower.

Another object of the invention is to provide temperature responsive means for controlling the operation of the servomechanism and means for circulating air from within the conditioned space across the temperature responsive means.

Another object of the invention is to provide an aspirator using the air circulated across the air blower speed controlling rheostat as primary air for drawing air from within the conditioned space across the temperature responsive means.

Still another object of the invention is to provide a forced air temperatre control system for controlling the temperature of a conditioned space and including a heat exchanger, a variable speed air blower for circulating air across the heat exchanger and an adjustable bypass damper between the blower and the heat exchanger for bypassing air around the heat exchanger wherein the speed of the air blower and the setting of the bypass damper are controlled as a function of the temperature of the conditioned space.

A further object of the invention is to simultaneously control the speed of the air blower and the setting of the bypass damper by means of a vacuum operated servomechanism.

Many other features, advantages and additional objects of the present invention will become manifest to those versed in the art upon making reference to the detailed description which follows and the accompanying sheets of drawings, in which preferred structural embodiments incorporating the principles of the present invention are shown by way of illustrative example only.

On the drawings:

FIGURE 1 is a perspective view of a tempearture control system constructed in accordance with the principles of the present invention with portions thereof shown in phantom;

FIGURE 2 is a vertical sectional view of a servomechanism of the invention with portions shown in elevation;

FIGURE 3 is an exploded view of the servomechanism of FIGURE 2;

FIGURE 4 is a wiring diagram of the circuitry for operating the variable speed electric motor driven air blower of the invention; and FIGURE 5 is a vertical sectional partially schematic view of a control console of the invention.

As shown on the drawings:

Although the principles of the present invention are of utility in any system for controlling the temperature of a conditioned space a particularly useful application is made to a system for controlling the temperature of the passenger compartment of an automobile or similar vehicular structure.

Referring to FIGURE 1, a temperature control system incorporating the principles of the present invention is indicated generally at reference numeral 10 and comprises a heat exchanger 11 and an air blower 12 for circulating air from the passenger compartment across the heat exchanger 11 and back to the passenger compartment.

The heat exchanger 11 may comprise a heating coil through which circulates a portion of the water used for cooling the engine block or similar air heating device. In recent years, however, it has become popular to cool the passenger compartment of an automobile for comfort purposes and the principles of this invention are equally applicable when the heat exchanger 11 takes the form of the cooling coil of an air conditioning unit.

In providing for the temperature control of the passenger compartment of an automobile the optimum amount of air circulated depends not only on the heating or cooling load and the design characteristics of the heat exchanger but also upon the quantity and velocity suitable for reaching all parts of the compartment including, for example, the area of the back seat. In this invention the air blower 12 is of the variable speed electric motor driven type and can be regulated to operate across a range of speeds from a maximum to a minimum which are dictated by the practical extremities of the performance characteristic curve of the blower.

The heat exchanger 11 is mounted in a duct work 13 connected at one end 14 to a discharge collar 16 of the blower 12 and comprising a plenum 17 on the downstream side of the heat exchanger 11.

Because of the parameters discussed above in determining air flow rate it is desirable under many conditions to circulate a greater amount of air than that which is simply required to provide the requisite cooling or heating capacity. For that reason a blend air door or bypass damper 18 is mounted in the duct work 13 between the air blower 12 and the heat exchanger 11. The damper 18 is mounted for pivotal movement within the duct work 13 and on the downstream side thereof the duct work diverges into a first branch 19 which directs air across the heat exchanger 11 and a second branch 20 which provides a bypass for directing air around the heat exchanger and into the plenum 17. The setting of the adjustable bypass damper or door 18 determines the percentage of the total quantity of air being circulated by the blower 12 which will pass across the heat exchanger 11 and which percentage will bypass the heat exchanger through the duct branch 20, as will be understood by those skilled in the art. From the plenum 17 the air is circulated back to the passenger compartment as indicated by the broken arrow at reference numeral 21.

Regulation of both the setting of the adjustable bypass damper 17 and the speed on the air blower 12 is accomplished through the utilization of one or more servomechanisms which are vacuum powered through connection to the intake manifold of the internal combustion engine of the automobile and controlled in response to the air temperature in the passenger compartment. In the illustrated embodiment only one servomechanism, indicated generally at reference numeral 22, performs both of these functions but it will be apparent to one skilled in the art that the speed of the air blower can be regulated by one servomechanism and the setting of the damper can be regulated by another servomechanism with both servomechanisms connected to the engine intake manifold.

Referring to FIGURES 1-3 the single dual-functioning vacuum operated servomechanism 22 of the illustrated embodiment of the invention comprises a cylindrical housing 23 having a radial end wall 24 at one end thereof and closed at the other end by means of a flexible rubber diaphragm or the like similar movable wall member 26 to define a vacuum chamber 27 of variable volume. The end wall 24 is fitted with a tubular connector 28 suitable for receiving a hose or similar conduit for communicating the chamber 27 with the intake manifold of the engine.

Details of the diaphragm 26 comprises a circumferentially continuous peripheral bead 29 which overlies an outturned flange 30 of the casing 23 and an axially extending cylindrical side wall 31 capable of doubling back over itself as shown at 32.

The diaphragm also comprises a radial end wall 33 which is apertured centrally at 34 and which has bonded to it along the interior surface thereof a rigid circular disc 36. The disc (of course, maintains a flat radial configuration of the end wall 33 and also serves to connect the movable wall 33 to bypass damper setting and blower speed regulating devices described hereinafter.

The engaging surfaces of the bead 29 and the flange 30 are maintained in leak-proof relation by means including a complementary groove 37 formed in an outturned flange 38 of a protective housing 39 and in which the bead 29 is disposed in snap-in assembly for abutting engagement with the flange 30.

The movable end wall 33 of the diaphragm 26 is constantly biased outwardly or to the right as viewed in FIGURE 2 by a coil spring 40, one end 41 of which abuts the end wall 24 of the housing 23 and an opposite end 42 of which abuts the disc 36. The movable wall 33 is able to move outwardly to a limiting position defined by a radial wall portion 43 of the protective housing 39. The position of the movable wall 33 shown in FIGURE 2 obtains in the absence of a vacuum condition in the chamber 27, but upon the application of a vacuum to chamber 27 the wall 33 will move inwardly or leftwardly as viewed in FIGURE 2 a distance depending upon the level of the vacuum being applied to chamber 27.

The movable wall 33 is linked to the bypass damper 18 by means of an axially extending arm 44 which protrudes through a bearing slot 45a formed in a wall portion 45 and which is connected in fixed assembly at one end 46 thereof to the rigid disc 36 by means of a rivet-type protuberance 47. An enlarged head 48 is formed at the distal end of the arm 44 and is slotted as at 49 to receive a crank end 50 of a rotatable shaft 51 connected in fixed assembly to the bypass damper 18. It is apparent from the drawings that as the arm 44 is moved axially along with the movable wall 33 of the diaphragm 26 the bypass damper 18 will be rotated in a clockwise or counterclockwise direction to permit a greater or lesser quantity of the air being circulated by the blower 12 to bypass the heat exchanger 11.

As noted, the speed of the blower 12 also varies as a function of the disposition of the movable wall 33. To accomplish this result an electrical contact 52 is securely fastened to the movable wall 33 through a rigid bracket 53 which may be formed integrally with the radial end portion 46 of the arm 44. The contact 52, which may be of the silver-carbon type, is arranged to engage and to move back and forth across the resistance windings 53 of a rheostat 54.

Another component of the rheostat 54 comprises a cross-shaped ceramic carrier 56 having a plurality of radial spokes 57 around which the coils 53 of the resistance wire are wound. A pair of metal annular caps 58, 58 are press-fit on the ends of the carrier 56 and are electrically connected respectively to the opposite ends of the resistance coil 53.

The carrier 56 is housed in a cylindrical portion 59 of the protective housing 39 which defines a chamber 60 interposed between a pair of chambers 61 and 62 formed within other cylindrical portions 63 and 64 of the protective housing 39.

The ceramic carrier 56 is secured within the chamber 60 by means of a pair of studs which are threaded through the wall of the cylinder 59 into snug electrical and mechanical engagement with the annular rings 58, 58.

The rheostat 54 is connected electrically in series with wiring connections 68 and 69 of the variable speed electric motor driven air blower 12 as will be appreciated in FIGURE 4 wherein the reference character M designates the motor of the blower 12, numerals 68 and 69 indicate the motor connections, numeral 54 indicates the rheostat and 52 designates the movable contact connected to the wall 33 of the diaphragm 26. Either stud 66 or 67 may be used for connecting the rheostat 54 to a power source 70 depending upon whether the system 10 is arranged so that a high or low vacuum condition exists in the vacuum chamber 27 when the heating or cooling load in the passenger compartment of the automobile is satisfied.

The contact 52 is connected by a conductor 55 to one of the terminals 68 and 69 of the blower motor, depending upon which of these two terminals is connected to one of the terminals 66 and 67 of the rheostat 54. Thus the voltage across terminals 68 and 69 and correspondingly the speed of the blower 12 varies in accordance with the positioning of contact 52 with respect to the coil 53 of the rheostat.

Where high voltage occurs across the windings of the rheostat 54 a significant amount of heat may be generated within the windings of the coil and in order to dissipate this heat a quantity of air being circulated by the blower 12 is diverted to pass across the coils or windings 53 of the rheostat 54.

In the illustrated embodiment a hose or the like conduit 70 is connected at one end 71 to the air plenum 17 and at an opposite end 72 to the cylindrical portion 63 of the housing 39. After the diverted air passes through the chamber 60 and across the windings of the rheostat 54 it is carried away from the rheostat through chamber 62.

A control console 75 is provided to regulate the level of vacuum applied to the chamber 27 of the servomechanism 22, and correspondingly the setting of the bypass damper 18 and the speed of the blower 12, as a function of air temperature within the passenger compartment. As illustrated in FIGURES 1 and 5, the console 75 comprises a housing 73 closed at the top by a cover plate 74. A pair of hose connections 76 and 77 extend into the housing 73, connection 76 being adapted for communication with the intake manifold of the automobile engine and connection 77 receiving one end of a hose 78, the other end of which is connected to the hose connection 28 of the servomechanism 22.

A bi-metal valve assembly 79 or similar temperature response valving mechanism is situated within the console housing 73 and comprises a bi-metal arm 80 which is securely fastened at one end 81 to a stationary pillar 82. A valve member 83 is formed at an opposite end 84 for seating on an annular ring 86 concentrically aligned with the hose connection 77.

The valve member 83 and the ring 86 have tapered mating surfaces whereby the valve serves as a modulating valve rather than simply an open-and-close valve.

The valve member end of the bi-metal arm 80 as well as the internal passages of the hose connections 76 and 77 are completely shrouded within the console housing 73 by means of an enclosure 87, one wall 88 of which is made of flexible material such as a rubber diaphragm and suitably apertured to receive the bi-metal arm 80 therethrough.

The bi-metal arm 80 regulates the operation of the valve member 83 as a function of the temperature of the arm as will be understood by those skilled in the art. Accordingly, to make the operation of the valve member 83 responsive to the air temperature in the passenger compartment of the automobile the present invention contemplates the provision of means for circulating a part of the in-car air across the bi-metal arm 80.

The control console 75 is mounted within the passenger compartment and preferably on the dashboard within easy reach of the driver of the automobile. A series of apertures 89 are formed in the cover plate 74 to enable in-car air to pass into the housing 73 and a bottom wall 90 has another series of apertures 91 formed therein around the enclosure 87.

Apertures 91 are enclosed on the outer side of wall 90 by a funnel-shaped transition member 92 which in turn is connected to one end 93 of a hose or similar conduit 94.

The function of the hose 94 is to aspirate in-car air through the apertures 89 of the cover plate 74 and across the bi-metal arm 80. In order to accomplish this function an opposite end 96 of the hose 94 is connected to a nipple 97 of an aspirator 98.

The primary air used in drawing the in-car air through the hose 94 is that portion of the circulated air which passes across the windings of the rheostat 54. Thus the aspirator 98 is coupled to the cylindrical nose 64 of the servomechanism housing 39 and both the primary air which flows across the rheostat 54 and the secondary air which is drawn through the control console 75 over the bi-metal arm 80 is discharged from the aspirator 98 through a discharge nozzle 99. The discharged air may be directed back into the passenger compartment or dumped to the outside.

Thus as the in-car temperature varies the setting of the valve assemblies 79 varies correspondingly to change the level of vacuum being applied to the servomechanism 22 which in turn varies the setting of the bypass damper 18 and the speed of the air blower 12.

The invention also contemplates the provision of means for selecting the temperature of the air in the passenger compartment. Again referring to FIGURES 1 and 5 an electric resistance heater 100 is mounted on the bi-metal arm 80 for changing the deflection of the arm and thus the setting of the valve member 83 independently of the in-car temperature. The heater 100 is connected in an electric circuit 101 in series with a rheostat 102 controlled by a manually operable control knob 103 carried on the console cover plate 74. Thus the heat generated by the heater 100 is varied in accordance with the setting of the control valve 103. An indicator arm 104 may be mounted on the control knob to facilitate setting of the knob in cooperation with suitable indicia 106 formed on the cover plate 74.

As previously mentioned, the valve assembly 79 need not be of the bi-metallic type since any suitable temperature responsive modulating gas valve may be conveniently utilized. It should also be noted that to prevent an invariable vacuum condition from obtaining in the vacuum chamber 27 of the servomechanism a small vent 107 is formed in the hose connector 77 to communicate with atmosphere on the vacuum chamber side of the valve member 83. The vent, of course, can also be conveniently located on the servomechanism 22 itself or, if desirable, a self-venting modulating valve can be utilized.

It is also apparent that a pair of servomechanisms, each controlling the setting of the bypass damper 18 or the speed of the blower 12, may be preferred to the single dual-functioning servomechanism 22 illustrated in the drawings. In addition the rheostat 54 may be conveniently located within the plenum 17. In such event the hose 70 would be used merely to supply the aspirator 98 with a source of primary air.

Although minor modifications might be suggested by those versed in the art, it should be understood that I wish to embody within the scope of the patent warranted hereon all such modifications as reasonably come within the scope of my contribution to the art.

I claim as my invention:

1. A temperature control system comprising:
    a variable speed electric motor driven air blower for delivering a stream of air across a heat exchanger to a conditioned space,
    electric circuit means including an adjustable rheostat for connection to said blower to vary the speed thereof,
    vacuum operated means for connection to a vacuum source and having means operative to vary the setting of said rheostat in response to variations in the level of vacuum applied thereto,
    temperature responsive vacuum control means operative to vary the level of vacuum applied to said vacuum operated means as a function of the temperature of the air in the conditioned space, and
    conduit means for carrying air from the stream across said rheostat to remove heat therefrom.

2. The temperature control system as defined in claim 1 and including aspirator means in said conduit means for drawing air from the conditioned space across said temperature responsive vacuum control means and for admixing such air with the air carried across said rheostat.

3. The combination with an automobile having an internal combustion engine with an air intake manifold, of a temperature control system for controlling the temperature of the air within the automobile comprising:
    a heat exchanger,
    a variable speed electric motor-driven air blower for circulating a stream of air across said heat exchanger,
    first electrical circuit means including a first adjustable rheostat for connection to said blower for varying the speed thereof,
    a vacuum-powered servo unit including an operating member movable in response to the level of vacuum acting on said servo unit and connected to said first adjustable rheostat for adjusting same,
    first air conduit means for connecting said servo unit to the intake manifold,
    temperature responsive valve means in said first air conduit means for regulating the level of vacuum to said servo unit,
    second air conduit means in communication with the air stream for circulating air within the automobile across said valve means, and
    second electrical circuit means including an electric heater operatively associated with said valve means and a second adjustable rheostat for selectively controlling the current through said electric heater.

4. The apparatus as defined in claim 3 wherein said second air conduit means includes means for diverting a portion of the air stream across said first rheostat.

5. The apparatus as defined in claim 3 and including:
    adjustable air damper means between said blower and said heat exchanger, and
    means interconnecting said damper and said movable member for moving said damper in response to variations in the level of vacuum being applied to said servo unit.

References Cited

UNITED STATES PATENTS

| | | | |
|---|---|---|---|
| 1,764,799 | 6/1930 | Kysor | 237—2 |
| 2,181,606 | 11/1928 | Parks | 236—68 |
| 2,234,288 | 3/1941 | Smith et al. | 236—68 |
| 2,273,000 | 2/1942 | Hans | 237—2 |
| 2,481,630 | 9/1949 | Tramonti. | |
| 2,740,587 | 4/1956 | Kraft | 237—2 |
| 3,319,888 | 5/1967 | Creager | 237—32 X |

EDWARD J. MICHAEL, *Primary Examiner.*